Aug. 14, 1951  A. W. MORTON  2,564,025

SPACER FOR WORN PISTON RING GROOVES

Filed Sept. 21, 1948

Inventor
Allen W. Morton

By Dodge and Imm.

Attorneys

Patented Aug. 14, 1951

2,564,025

UNITED STATES PATENT OFFICE 2,564,025

SPACER FOR WORN PISTON RING GROOVES

Allen W. Morton, Baltimore, Md., assignor to Koppers Company, Inc., Pittsburgh, Pa., a corporation of Delaware Application September 21, 1948, Serial No. 50,409

4 Claims. (Cl. 309—44)

This invention relates to means for salvaging pistons whose ring grooves have become worn.

It is well known that ring grooves are subject to wear and invariably the top ring groove in a single acting piston, i. e. the groove nearest the head of the piston, shows the greatest wear and the greater amount of this wear is on the side of the groove nearest the head of the piston. One procedure has been to cut the groove wider, and use a ring of greater than normal width so as to fill the widened groove. The use of non-standard rings is objectionable both because it requires an undesirable number of sizes to be carried in stock, and because widening the grooves to any appreciable extent weakens the piston particularly aluminum pistons of sizes used in automotive engines.

The use of shims has also been attempted but because there has been no satisfactory way of locking these shims in the groove to prevent them from projecting beyond the piston and scoring the cylinder, the results have often been unsatisfactory. Unless these shims are held securely in place, they are apt to break and severely damage the cylinder and piston. According to the invention the ring groove is turned to a slightly greater width, with an undercut channel on the side toward the piston head. The increase of width is dimensioned according to the thickness of a shim ring, which is non-planer and carries at its inner margin a flange which engages in the undercut channel. After the shim is in place a new piston ring of the same dimensions as originally characterized the worn-out ring is mounted in the groove, and deflects the inner margin of the shim, so that the shim hugs the wall of the groove. Thus, working of the shim in the groove is resisted and the tendency of the slender shim to break is greatly reduced.

This differs from the construction illustrated in Fig. 2 of the Madsen Patent No. 1,667,941, May 1, 1928, in several respects namely, the shim is on the head side of the groove, the body of the shim is non-planar, and in proportion to its radial dimension is very much thinner than is Madsen's.

As a practical matter of marked commercial importance, applicant's shim is not machined to form, but is produced by flanging a thin edge curled strip. It is thus slender, highly elastic, and not unduly expensive, as machined shims would be.

The invention will now be described in detail by reference to the accompanying drawing, in which.

Figure 1:
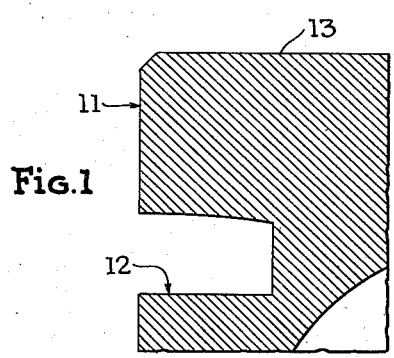
Fig. 1 is a fragmentary axial section of a piston having a worn groove.
Figure 2:
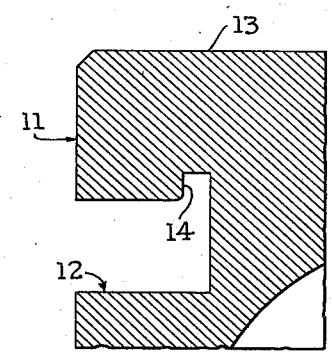
Fig. 2 is a similar view showing the same groove widened and under-cut.

In all figures the piston appears at 11 and the top ring groove at 12. The piston head is indicated at 13. Fig. 1 shows groove 12 in its worn condition. Fig. 2 shows groove 12 widened by an amount equal to the thickness of the shim to be used, and provided with an undercut 14 at the root of that side which is toward head 13.

Figure 6:
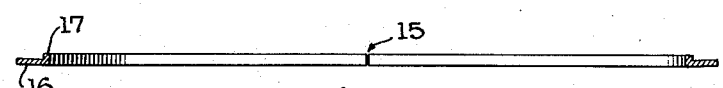
Fig. 6 is a section on the line 6—6 of Fig. 5.

The shim is in the form of a ring split at 15 and having a generally L-shaped cross-section. The main portion 16 of the shim, corresponding to the long arm of the L, is nearly but not quite flat and the part which corresponds to the short arm of the L is a flange 17 at the inner periphery of the main portion. The departure from flatness can best be explained by imagining the ring as shown in Fig. 6 to be laid on a plane surface with the flange 17 up. The outer periphery of portion 16 would then be slightly spaced above the plane.

The shim is formed by edge-curling and flanging a thin strip of steel in any known way, so that fillets are formed at the base of flange 17. This affords a strong and inexpensive shim.

Figure 3:
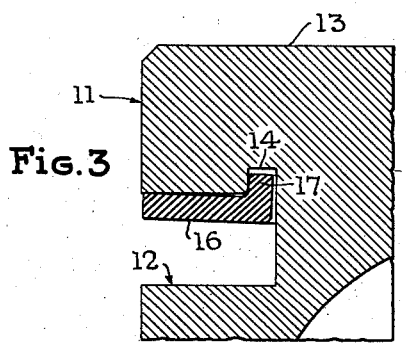
Fig. 3 is a similar view showing the shim in place.
Figure 4:
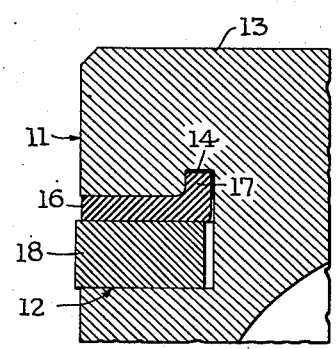
Fig. 4 is a similar view showing the new ring in place and holding the shim flat.
Figure 5:
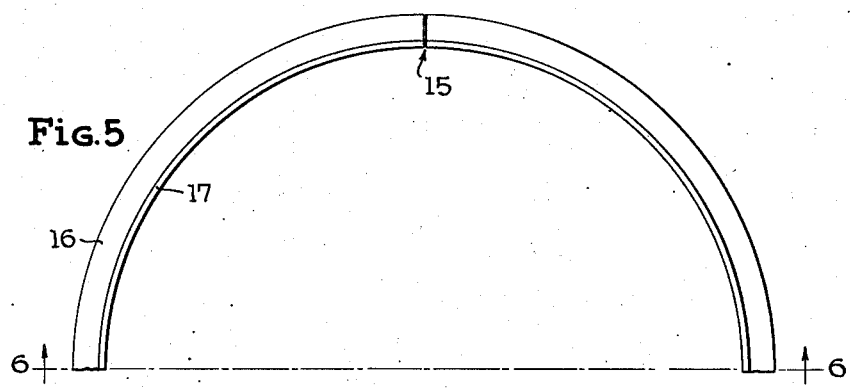
Fig. 5 is a half plan view of a shim.

Of course the shim must be properly dimensioned to the groove and its undercut. Fig. 3 shows the shim in the ring groove before, and Fig. 4 shows the same parts after insertion of a piston ring 18 of usual form. This piston ring could and preferably would have the same dimensions as the ring originally used in that groove of the piston.

As indicated in Fig. 4, the piston ring 18 flattens the shim to a considerable extent, and preferably substantially completely. The flange 17 should make a reasonably good fit in the undercut 14. The main portion 16 should not project beyond the piston periphery. As shown in Fig. 4, it is nearly flush but the important thing is to avoid projection or any dimensioning which would permit the shim to engage and scuff the cylinder walls.

Location of a single flanged shim on the side toward the piston head and the mounting of the shim under elastic stress are each important features and each is believed to be novel.

I claim:

1. A shim for mounting in a piston ring groove having an undercut in one side of the groove substantially at the bottom thereof, said shim comprising a split ring of elastic metal thin in axial dimension as compared with its radial dimension, nearly but not quite flat, and having at its inner margin a flange dimensioned to enter said undercut, the departure from flatness being such that if the ring be laid on a plane surface with the flange projecting up, the outer margin of the ring will be spaced from said plane surface.

2. A shim as defined in claim 1 in which the flange is formed from thin elastic strip steel stock and the junction of the flange with the main body of the ring is characterized by the presence of a fillet.

3. The combination of a piston having a head and a ring groove adjacent said head, said groove having an undercut in its side and adjacent the bottom of the groove; a shim of the form defined in claim 1 mounted against the undercut side with its flange in the undercut; and an expansible piston ring filling the remainder of the groove and serving to flex said shim toward flat condition.

4. The combination of a piston having a head and a ring groove adjacent said head, said groove having an undercut in its side toward the head and adjacent the bottom of the groove; a shim of the form defined in claim 1 mounted against the undercut side with its flange in the undercut; and an expansible piston ring filling the remainder of the groove and serving to flex said shim toward flat condition.

ALLEN W. MORTON.

REFERENCES CITED

The following references are of record in the file of this patent:

UNITED STATES PATENTS

| Number | Name | Date |
|---|---|---|
| 1,495,705 | Malmberg | May 27, 1924 |
| 1,557,643 | Young | Oct. 20, 1925 |
| 1,667,941 | Madsen | May 1, 1928 |
| 1,781,183 | Lewis et al. | Nov. 11, 1930 |
| 2,225,508 | Sandow | Dec. 17, 1940 |
| 2,365,725 | Phillips | Dec. 26, 1944 |
| 2,415,984 | Ballard | Feb. 18, 1947 |

FOREIGN PATENTS

| Number | Country | Date |
|---|---|---|
| 487,709 | Germany | of 1929 |